(12) United States Patent
Darling et al.

(10) Patent No.: US 10,851,440 B2
(45) Date of Patent: *Dec. 1, 2020

(54) NANOCRYSTALLINE HIGH TEMPERATURE MACHINE PARTS

(71) Applicant: U.S. Gov't as represented by Sec of Army, Adelphia, MD (US)

(72) Inventors: Kristopher Allen Darling, Havre De Grace, MD (US); Scott Martin Grendahl, Newark, DE (US); Laszlo John Kecskes, Havre De Grace, MD (US); Kiran N. Solanki, Tempe, AZ (US); Heather Ann Murdoch, Baltimore, MD (US); Thomas Lee Luckenbaugh, Spring Grove, PA (US); Anthony James Roberts, Chesapeake City, MD (US); Billy Chad Hornbuckle, Aberdeen, MD (US)

(73) Assignee: The United States of America as represented by the Secretary of the Army, Washinton, DC (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/130,629

(22) Filed: Sep. 13, 2018

(65) Prior Publication Data
US 2019/0119788 A1 Apr. 25, 2019

Related U.S. Application Data

(63) Continuation-in-part of application No. 15/896,804, filed on Feb. 14, 2018.
(Continued)

(51) Int. Cl.
*C22C 19/00* (2006.01)
*B22F 9/00* (2006.01)
(Continued)

(52) U.S. Cl.
CPC .............. *C22C 19/007* (2013.01); *B22F 3/00* (2013.01); *B22F 3/10* (2013.01); *B22F 5/00* (2013.01);
(Continued)

(58) Field of Classification Search
CPC .................... C22C 19/007; B22F 9/00
(Continued)

(56) References Cited

U.S. PATENT DOCUMENTS 9,333,558 B2 * 5/2016 Darling ................ B22F 1/0018
9,791,394 B2 * 10/2017 Murdoch ................ C22C 5/02
(Continued)

OTHER PUBLICATIONS

Ashby, M. F., "A first report on deformation-mechanism maps," Acta Metall. 20, 887-897 (1972).
(Continued)

*Primary Examiner* — Weiping Zhu
(74) *Attorney, Agent, or Firm* — Eric B. Compton

(57) ABSTRACT

Novel metallic systems and methods for their fabrication provide high temperature machine parts formed of a consolidated nano-crystalline metallic material. The material comprises a matrix formed of a solvent metal having a melting point greater than 1,250° C. with crystalline grains having diameters of no more than about 500 nm, and a plurality of dispersed metallic particles formed on the basis of a solute metal in the solvent metal matrix and having diameters of no more than about 200 nm. The particle density along the grain boundary of the matrix is as high as about 2 $nm^2$ of grain boundary area per particle so as to substantially block grain boundary motion and rotation and limit creep at temperatures above 35% of the melting point of the consolidated nano-crystalline metallic material. The
(Continued)

machine parts formed may include turbine blades, gears, hypersonics, radiation shielding, and other high temperature parts.

21 Claims, 9 Drawing Sheets

Related U.S. Application Data

(60) Provisional application No. 62/459,243, filed on Feb. 15, 2017, provisional application No. 62/558,500, filed on Sep. 14, 2017.

(51) Int. Cl.
```
B22F 3/00      (2006.01)
B22F 5/00      (2006.01)
C22C 1/04      (2006.01)
C22C 33/02     (2006.01)
B22F 3/10      (2006.01)
B82Y 30/00     (2011.01)
```

(52) U.S. Cl.
CPC .............. *B22F 5/008* (2013.01); *B22F 5/009* (2013.01); *B22F 9/00* (2013.01); *C22C 1/045* (2013.01); *C22C 1/0433* (2013.01); *C22C 33/0207* (2013.01); *B22F 2301/15* (2013.01); *B22F 2999/00* (2013.01); *B82Y 30/00* (2013.01)

(58) Field of Classification Search
USPC .......................................................... 75/247
See application file for complete search history.

(56) References Cited

U.S. PATENT DOCUMENTS

```
 9,822,430  B2 * 11/2017  Kecskes  ................... B22F 3/02
10,209,208  B2 *  2/2019  Murdoch  .................. C22C 5/02
10,487,375  B2 * 11/2019  Kecskes  ................... F42B 3/28
2016/0319397 A1    11/2016  Kecskes et al.
2018/0229308 A1 *  8/2018  Kecskes  ................. B22F 9/002
```

OTHER PUBLICATIONS

H. Zoz, H. Ren, R. Reichardt, H.U. Benz, "Mechanical Alloying-Principle, Development & Current Activities (Part I-VII)," Thermec2000, International Conference on Processing & Manufacturing of Advanced Materials Dec. 4-8, 2000, Las Vegas, Nevada, U.S.A., (available online at: http://gmbh.zoz.de/_AKTUELL/pdf_content/publications/v14.pdf).

Mohamed, F. A. & Li, Y., "Creep and superplasticity in nanocrystalline materials: current understanding and future prospects," Mater. Sci. Eng. A 298, 1-15 (2001).

Introduction to Mineral Science by Andrew Puntis Cambridge University Press 2003, ISBN 0 521-41922-0, pp. 333, 334, 336 and 337.

Materials Science and Engineering "An Introduction" 9th Ed. by William D Canister Jr., and David G Rethwisch, Wiley ISBN 978-1-118-32457-8, 2013. p. 456.

Hornbuckle, B. C. et al., "Effect of Ta solute concentration on the microstructural evolution in immiscible Cu—Ta Alloys.," JOM 67, 2802-2809 (2015).

Presentation titled "Creep Resistant Bulk Nanocrystalline Cu Alloys" authored by Chad Hornbuckle, Mageshwari Komarasamy, Kris Darling, Laszlo Kecskes, Tom Luckenbaugh, Scott Grendahl, Mansa Rajagopalan, Kiran Solanki, and Rajiv Mishra, presented at the 2016 TMS Annual Meeting, Nashville, TN, Feb. 15, 2016, by Dr. Chad Hornbucke.

K. A. Darling, M. Rajagopalan, M. Komarasamy, M. A. Bhatia, B. C. Hornbuckle, R. S. Mishra & K. N. Solanki, "Extreme creep resistance in a microstructurally stable nanocrystalline alloy," Nature 537, 378-381 (Sep. 15, 2016) doi:10.1038/nature19313 (Received May 4, 2016; Accepted Jul. 8, 2016; Published online Sep. 14, 2016).

"Nanotechnology may revolutionize future engines," ARL Inside, Sep. 19, 2016.

Koju, R.K., Darling, K.A., Solanki, K.N., Mishin, Y., Atomistic modeling of capillary-driven grain boundary motion in Cu—Ta alloys, Acta Materialia 148 (2018) 311-319.

M.A. Meyers, A. Mishra, D.J. Benson, "Mechanical properties of nanocrystalline materials," Progress in Materials Science 51 (2006) 427-556.

S. Gollapudia, et al., "Creep in nanocrystalline materials: Role of stress assisted grain growth," Materials Science and Engineering A 527 (2010) 5773-5781.

Mark A. Atwater and Kris A. Darling, "A Visual Library of Stability in Binary Metallic Systems: The Stabilization of Nanocrystalline Grain Size by Solute Addition: Part 1," ARL-TR-6007, May 2012.

K.N. Solanki, K.A. Darling, M. Komarasamy, M. Rajagopalan, M.A. Bhatia, B.C. Hornbuckle, R. Mishra, Slide Presentation titled "Creep behavior of a microstructurally stable nanocrystalline alloy," TMS2017, Feb. 26-Mar. 2, 2017.

K. A. Darling, Slide Presentation titled "Nanocrystalline Metals in Army and DoD Applications," ARL, Feb. 27, 2017.

\* cited by examiner

Small Particles in the grains of the matrix

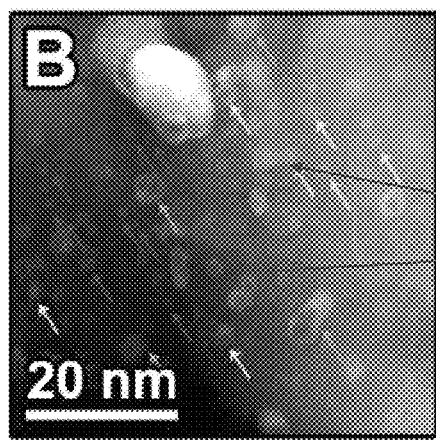

Arrows point to small particles

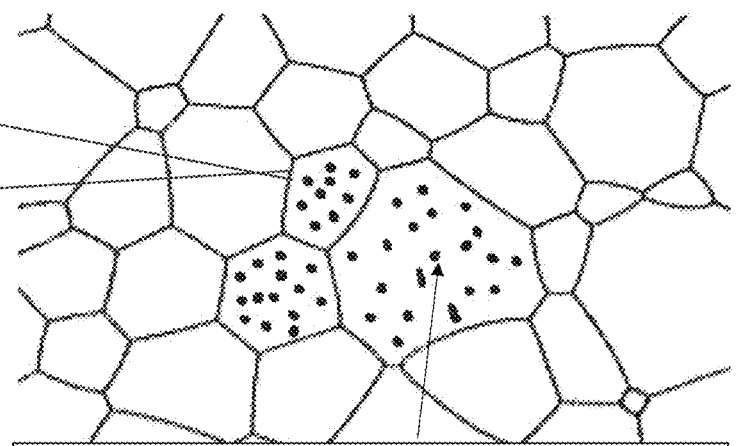

Small particles in the grains of the matrix.
The chemistry of these particles will contain the solute metals The frequency of the appearance will depend
on the concentration of the alloying element and the degree of processing.

These smaller will be coherent and/or semi-coherent having diameters typically less than 20 nm.

FIG. 1A

Small Particles residing at the grain boundaries

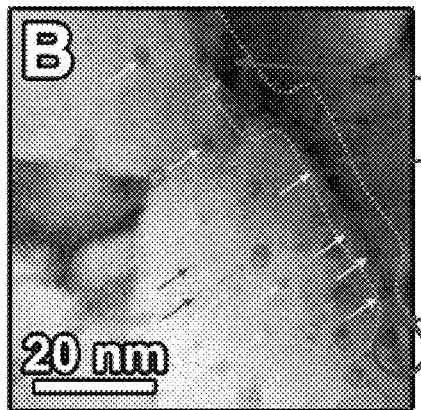

See image "F," below, for details within circle

Low magnification image showing particle along a grain boundary
The grain boundary is in between the dotted lines.

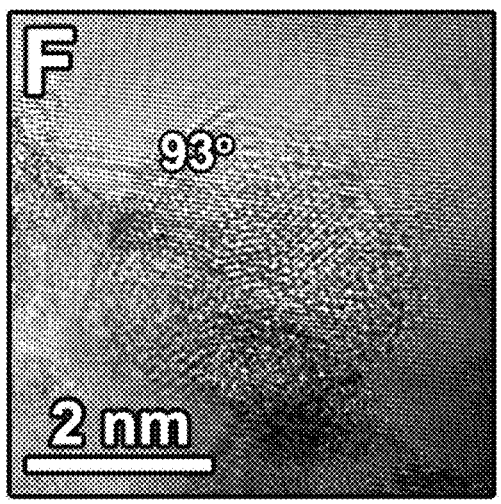

High magnification image showing a particle along a grain boundary (in circle above)

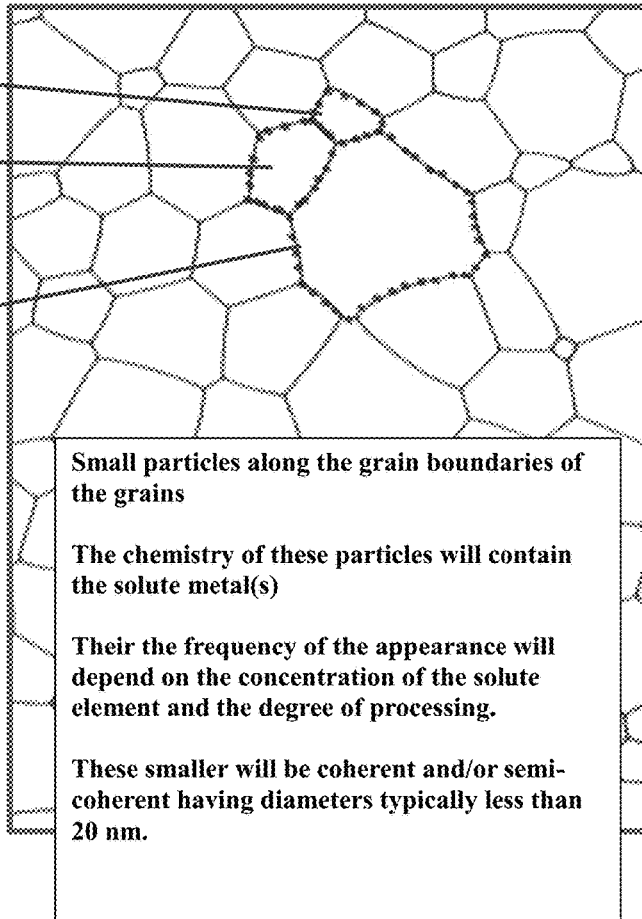

Small particles along the grain boundaries of the grains

The chemistry of these particles will contain the solute metal(s)

Their the frequency of the appearance will depend on the concentration of the solute element and the degree of processing.

These smaller will be coherent and/or semi-coherent having diameters typically less than 20 nm.

Arrows point to small particles

FIG. 1B

A. Particle embedded in a grain of the matrix with ideal coherency (i.e. no strained atomic bonds)

B. Coherent particle embedded in a grain of the matrix with negligible strained atomic bonds at the interface C. Semi-Coherent Particle embedded in a grain of the matrix D. Incoherent Particle embedded a grain of the matrix

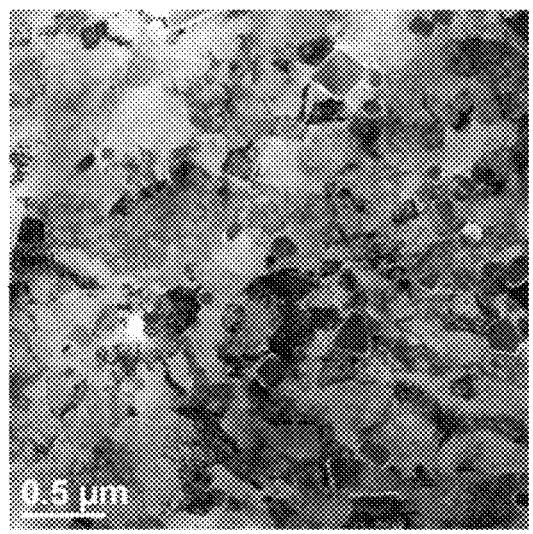
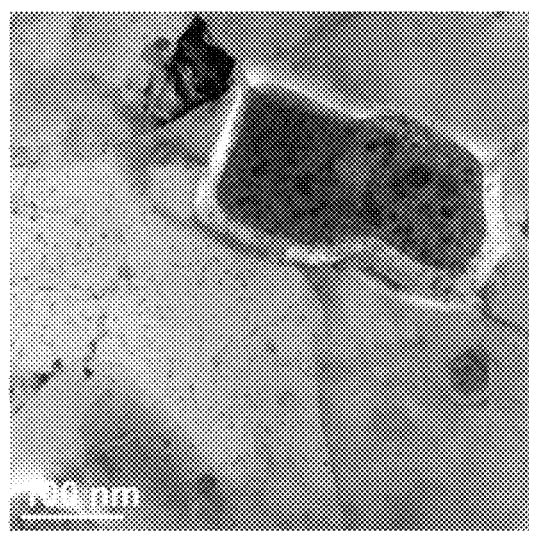
FIG. 5A
FIG. 5B
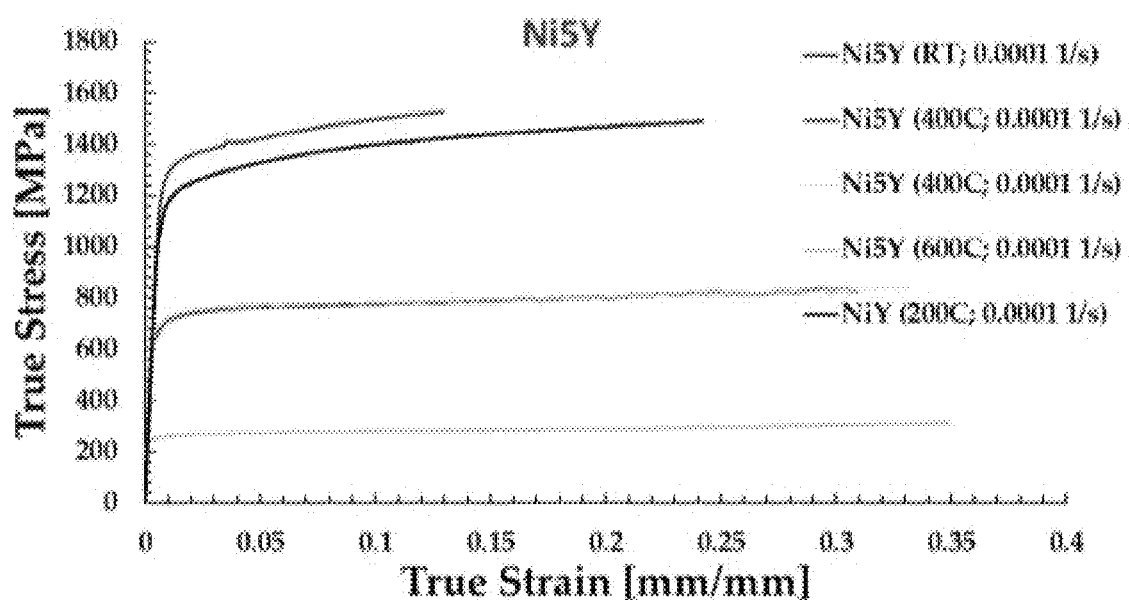
FIG. 6

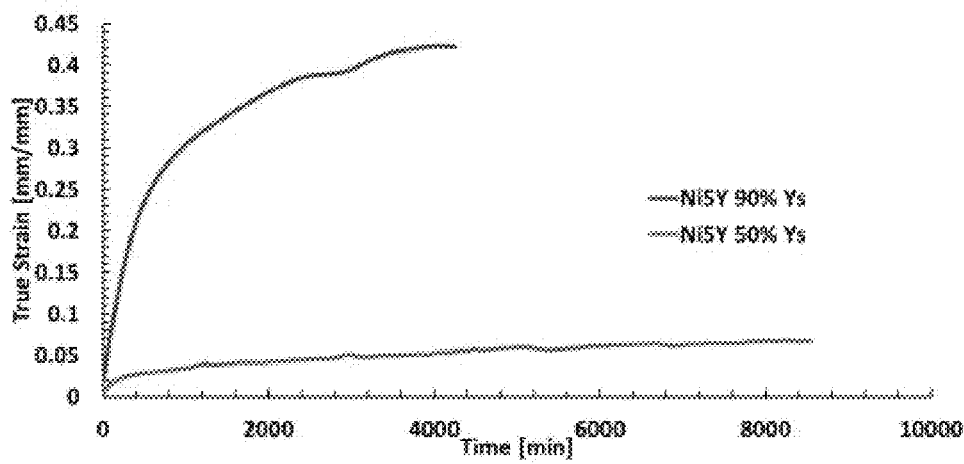
FIG. 7
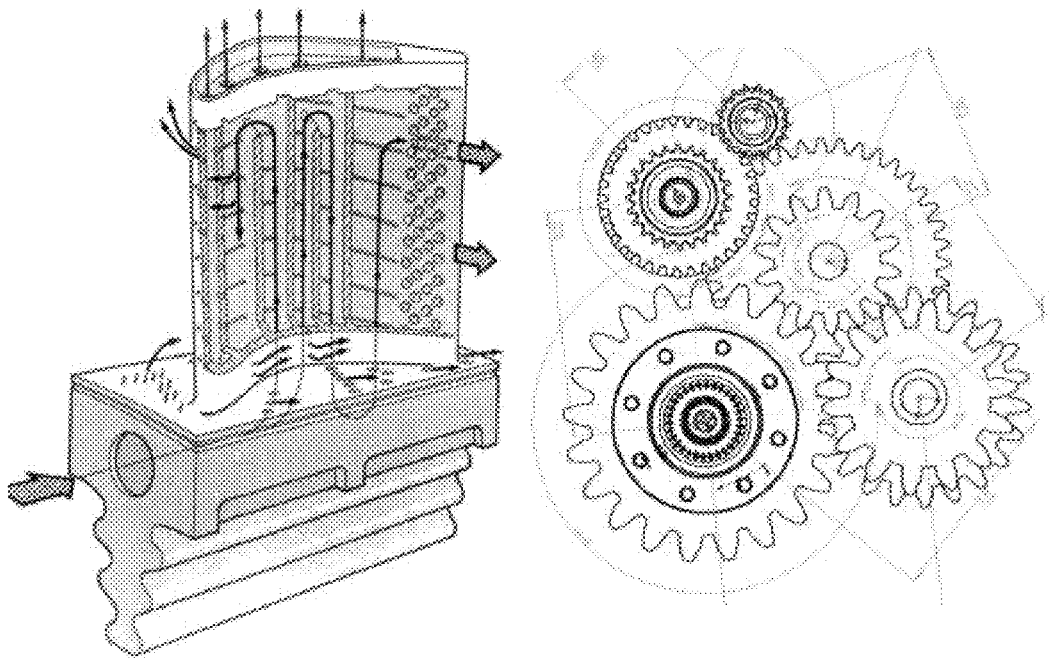
FIG. 8A
(*Related Art*)
FIG. 8B
(*Related Art*)

NANOCRYSTALLINE HIGH TEMPERATURE MACHINE PARTS

RELATED APPLICATION DATA

This application is a continuation-in-part (CIP) of U.S. patent application Ser. No. 15/896,804 filed on Feb. 14, 2018, which in turn, claims the benefit of U.S. Provisional Patent Application No. 62/459,243 filed on Feb. 15, 2017. In addition, this CIP application claims the benefit of U.S. Provisional Patent Application No. 62/558,500 filed on Sep. 14, 2017.

The aforementioned application disclosures are hereby incorporated by reference in their entireties for all purposes.

GOVERNMENT INTEREST

Some of the research underlying the invention was supported by the U.S. Army Research Laboratory under contracts W911QX-17-C-0021 and W911NF-15-2-0038.

The invention described herein may be manufactured, used, and licensed by or for the United States Government.

BACKGROUND OF THE INVENTION

I. Field of the Invention

The present invention relates generally to high temperature machine parts formed from nano-crystalline metallic materials and their fabrication.

II. Description of Related Art

Many industries heavily depend on parts having high-structural strength with high thermal stability. Inside turbines and other engines, temperatures can soar to more than 1,250° C. Conventional materials are at their limits and the progress of increasing engine efficiency have stagnated. The current state of the art engine and high temperature resistant materials are single crystal Ni and or Co based alloys. While these material have been found to perform well in turbine applications and other high temperature applications, they are rather expensive to fabricate.

Nanocrystalline (NC) metals with a mean grain size below 100 nm have superior room temperature strength in part due to a large reduction in grain size. However, this high strength generally comes with dramatic losses in other properties, such as creep resistance, which limits their practical utility. For instance, the creep rates in NC—Cu are about four orders of magnitude higher than typical coarse-grained Cu. The significant degradation in creep resistance of NC-materials is in part due to an increase in the large volume fraction of grain boundaries (GBs), which lack long range crystalline order and lead to GB diffusional processes such as diffusional creep, sliding and/or rotation.

Historically over the past 50 years, the reduction/elimination of intrinsic topological defects (grain or cell boundaries) has been central to the design of creep-resistant materials, i.e., current designs enhance high temperature creep performance through the use of single crystal alloys, e.g., Ni-based, single crystal superalloys. Therefore, nano-grained materials having grain sizes 7-8 orders of magnitude smaller along with GB volume fractions 5-6 orders higher than those in the currently used superalloys have never been considered viable for high temperature creep applications. Moreover, NC-metals exhibit microstructural instability, i.e., grain growth (diffusional processes such as diffusional creep, sliding and/or rotation) at moderately low and sometimes even room temperature and/or in combination with deformation. Consequently, prior creep studies on NC-metals have reported creep stress exponents of 1-3 resulting from grain size effects on diffusional (Coble) creep.

SUMMARY OF THE INVENTION

Novel metallic systems and methods for their fabrication providing high temperature machine parts formed of a consolidated nano-crystalline metallic material are disclosed.

According to embodiments, the consolidated nano-crystalline metallic material comprises: a matrix formed of a solvent metal having a melting point greater than 1,250° C. with crystalline grains having diameters of no more than about 500 nm, and a plurality of dispersed metallic particles formed on the basis of a solute metal in the solvent metal matrix and having diameters of no more than about 200 nm. The particle density along the grain boundary of the matrix may be as high as about 2 $nm^2$ of grain boundary area per particle so as to substantially block grain boundary motion and rotation and limit creep at temperatures above 35% of the melting point of the consolidated nano-crystalline metallic material.

In the nano-crystalline metallic material, the solvent metal may comprise about 50 to 99.9 atomic percent (at. %) of the material, and the dispersed metallic solute metal may comprise the remainder, i.e., 0.1 to 50 atomic percent (at. %) of the material.

The solvent metal comprises a solvent having a high-temperature melting point, such as iron (Fe), nickel (Ni), titanium (Ti), cobalt (Co), vanadium (V), niobium (Nb), tantalum (Ta), molybdenum (Mo) or tungsten (W), as non-limiting examples. The solvent and solute may be judiciously selected such that the resulting elastic enthalpy is 1 to 250 kJ/mol, the mixing enthalpy is −150 to +150 kJ/mol, the minimum normalized boundary energy is 1 to 40%, the boundary concentration at the free energy minimum is 10 to 100%, or any combination thereof.

In one particular embodiment, the solvent metal may comprise nickel (Ni) and the solute metal may comprise yttrium (Y). More particularly, it may comprise Ni-5at. % Y or Ni-5Y.

Moreover, in some instances, at least some of the particles may comprise one or more solute metals and may contain additional elements, such as oxygen (O), nitrogen (N), carbon (C), sulfur (S) or other trace elements (i.e. from the remainder of the periodic table), with the total amount of the trace element(s) generally not exceeding 1 at % of the material; O, N, C and S may be higher in concentration such as 20-30 at. % or even higher. The particle number densities within the volume of material may be in the range of $10^{15}$ to $10^{30}$ per cubic meter.

The creep rate may be less than $10^{-6}$ $s^{-1}$ at greater than 35% of the melting point of the material. More specifically, the creep rate may be less than $10^{-6}$ $s^{-1}$ at greater than 20% of their respective yield point values at temperatures greater than 35% of the melting point of the material.

Various types of particles may be present in the materials, with at least some of the particles being coherent particles having diameters less than about 5 nm, semi-coherent particles having diameters between about 5 and about 20 nm, and/or incoherent particles having diameters in excess of about 20 nm and no more than about 200 nm.

The solute metal may comprise at least 0.1 atomic percent of the material so as to limit rotation of grains to no more than about 45 degrees (and perhaps even limited to less 30 degrees). The material may have a room temperature yield strength of at least 1 GPa and a room temperature compressive ductility greater than 3% or a tensile ductility of at least 0.5%, for instance.

The machine parts formed may include turbine parts, engine parts, gears, hypersonics, radiation shielding, and various other high temperature parts.

According to embodiments, a process for forming a high temperature machine part may include: subjecting metals of the solvent metal and the at least one solute metal to a non-equilibrium processing technique and/or followed by exposure to elevated temperatures so as to produce: a matrix formed of a solvent metal or alloy having a melting point greater than 1,250° C. with crystalline grains having diameters of no more than about 500 nm, and a plurality of dispersed metallic particles formed from a basis of the solute metal in the solvent metal matrix and having diameters of no more than about 200 nm; and performing a bulk consolidation process on thus produced material to form the machine part. The particle density along the grain boundary of the matrix may be as high as about 2 $nm^2$ of grain boundary area per particle so as to substantially block grain boundary motion and rotation and limit creep at temperatures above 35% of the melting point of the material.

The non-equilibrium processing technique may comprise milling/machining (including ball milling), melt spinning, spray atomization, inert gas condensation, solution precipitation, physical vapor deposition, and electrodeposition. Both high-energy and low-energy milling devices might be used.

The bulk consolidation process may comprise pressureless sintering, hot isostatic pressing, cold isostatic pressing, hot pressing, powder injection molding, friction stir weld processing, cold and thermal spray, laser and non-laser based additive manufacturing techniques, ultrasonic consolidation techniques, vacuum arc melting, field assisted sintering, dynamic compaction using explosives or forging-like operations, hot extrusion, cold extrusion, swaging or equal channel angular extrusion.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIGS. 1A, 1B and 1C show additional features and details of the cage structure.

FIG. 5A and FIG. 5B are bright field transmission electron micrographs of the Ni-5at. % Y produced at two different resolutions.

FIG. 6 is a plot showing the high strength of the Ni-5at. % Y alloy exceeding 1 GPa.

FIG. 7 is a plot showing creep plots of strain versus time at temperature for Ni-5at. % Y at two different stresses as fractions of the at temperature yield stress, 50 and 90%, respectively.

FIG. 8A shows a typical turbine blade, and FIG. 8B shows a series of typical engine gears, as example machine parts, which can be fabricated according with the novel NC materials according to embodiments.

DETAILED DESCRIPTION

Figure 1:
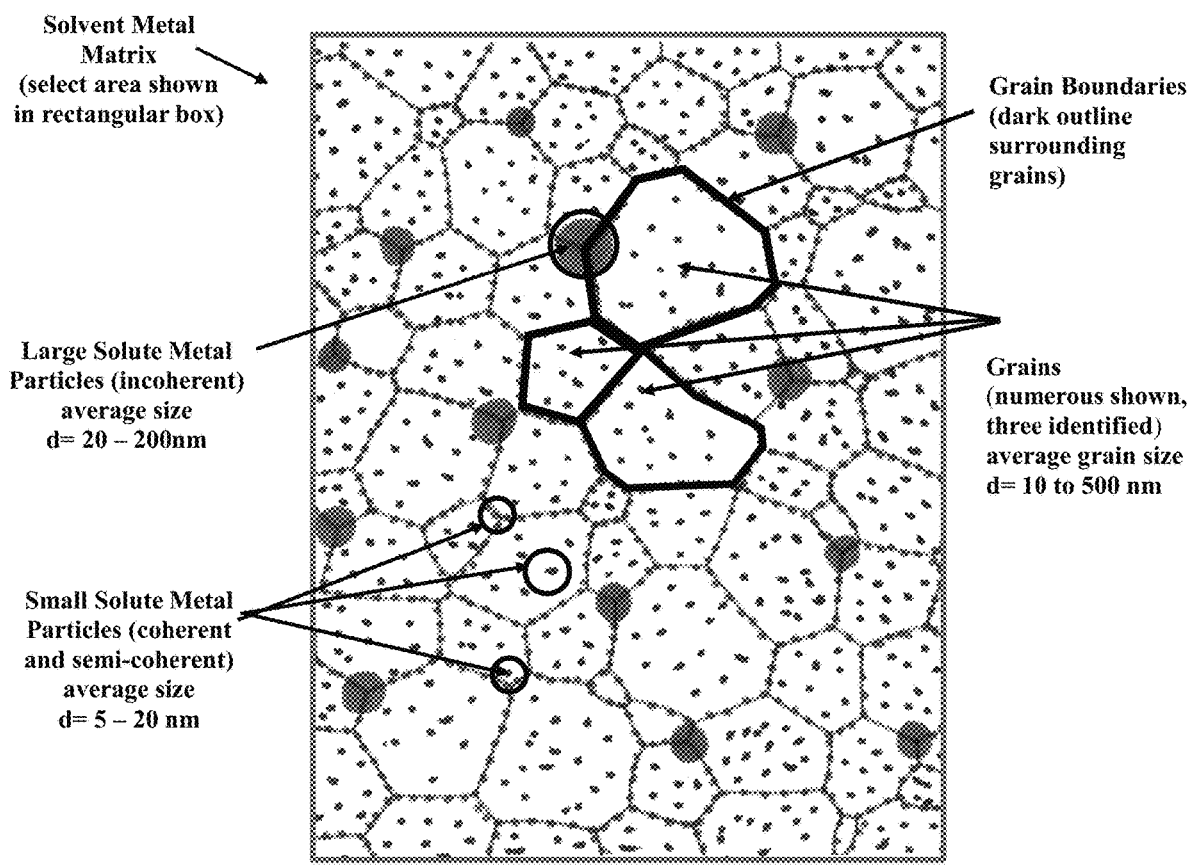
FIG. 1 illustrates a simplified schematic of an interlocking immobile cage structure for extreme creep-resistant nano-crystalline metallic materials according to embodiments of the present invention.

The parent application, U.S. patent application Ser. No. 15/896,804 filed Feb. 14, 2018 discloses a novel microstructure which give rise to creep resistance, i.e. the interlocking immobile cage structure, regardless of the metal. That patent application primarily discussed a copper-solvent based alloy system, and demonstrated that the Cu—Ta alloy has 6-8 orders of magnitude increase in creep resistance. The Cu—Ta alloy is only one exemplary of this class of materials.

Copper has a melting point of about 1,085° C. However, inside turbines and for other high temperature applications, temperatures can soar to more than 1,250° C. Thus, copper solvent based metallic systems may not be ideal for these conditions.

The aforementioned work in stabilized Cu—Ta alloys have shown 6-8 orders of magnitude increase in creep resistance, which is on par with single crystal based Ni super alloys. The microstructure and processing of the Cu—Ta material systems can be extended to other high-temperature metals according to embodiments of the present invention.

Novel metallic systems and methods for their fabrication provide an interlocking nano-scale substructure in metal and alloyed systems which provide extreme creep-resistant nano-crystalline metallic materials.

The underlying substructure phenomenon entails the uniform dispersion of small fragments of one or more low diffusivity metals (solute) in another metal (solvent), whereby their immobility causes the mobility of the grain boundaries of the solvent grains to be prevented. The nano-scale dispersion of the solute creates obstacles in the path of diffusing point and line defects that essentially shut down the underlying mechanisms for creep to take place. In turn, these nanoscale grains give rise to unprecedented properties, including high-temperature creep resistance properties. An exemplary Ni—Y alloy system is described; however, the selection, design, and fabrication methodology are not limited to this particular material system, and the advantageous results are believed to extend to many other nano-crystalline metallic materials.

The unusual combination of properties may be achieved through non-equilibrium processing which creates distinct grain boundary-pinning particles that favor kinetic stability of grains, i.e., the retention of nano-sized grains under extremely long-term creep conditions. This enables the development of a new class of structural materials and alloys with both high strength and creep resistance. The novel materials may be suitable for a wide variety of high temperature applications, including those in the aerospace, naval, civilian infrastructures and energy sectors.

I. High Temperature Creep

The phenomenon of creep is the long-term, time-dependent, flow or deformation of a material subjected to a constant stress, especially at high temperatures. Typically, during creep, the applied stress levels are below the yield stress of the material, however, given the right combination of time, temperature, and stress, the extent of deformation can be large enough to lead to failure of the part. Because creep occurs slowly, the plastic strain in the material builds up gradually. As expected, the onset of creep is strongly dependent on the temperature relative to the material's melting point. That is, once a certain temperature is exceeded, typically, 0.5 of the melting point temperature or above (and, closer the temperature is to the material's melting point), the greater the resultant creep deformation will be.

In most monolithic crystalline metals and alloys, creep occurs in three stages. During the first stage, or primary creep, the creep strain rate is variable, initially high, decreasing to a roughly constant value and steady state conditions are attained. This second stage, or steady state creep, is characterized by a primary deformation mechanism and, as such, the applied stress can be related to the resultant strain via a series of analytical or empirical relationships. The final stage, or tertiary creep, involves a renewed rapid increase in the creep strain rate, which is caused by the onset of gross deformation resulting in the inevitable failure of the material.

Several theories exist to account for the creep behavior of metals and alloys. Generally, the creep strain, which is a strong function of temperature and the applied stress level, is related to temperature via an Arrhenius type exponential function, and related to stress via a conventional power-law function. Usually, the magnitude of the creep exponent ranges between 1 and 8. In certain materials, the exponent can be even higher.

In coarse-grained crystalline materials, creep mechanisms usually entail the individual or collective movement of atoms and line defects; that is, either by diffusion- or by dislocation-based mechanisms. In the former, such as that occurring during Coble creep, depending on the actual mechanism, individual atoms can move either through the bulk of the crystalline solid or along the grain boundaries between crystalline grains. In contrast, in the latter, dislocations can climb around obstacles or glide through the crystal lattice. Regardless, the measure of the extent of creep, as revealed by the creep exponent, usually has a value of 1 or is linear for diffusion-based processes; whereas, for dislocation-based processes, the creep exponent tend to be larger, between 3 and 6.

An overlooked factor in the aforementioned creep strain relationship is the role of the material's grain size. As the grain size of the material decreases, especially, into the nano-scale regime, its role can become quite important in dictating which deformation mechanisms will be active to accommodate the applied stress. Specifically, with decreasing grain size, the grain boundary volume in the bulk increases dramatically. It is important to recognize that, unlike the ordered structure of the grain interiors, the grain boundary volume will have a mostly disordered structure. And, while it will lead to extraordinary properties not seen in conventional materials, in turn, the role of this grain boundary volume will dominate the behavior of the material.

A crystal structure free of the pathways (e.g., topological defects and flaws) that would disallow the movement of atoms or line defects, in turn, would result in a very high creep resistance. Such are the class of single crystal super-alloys. However, unlike these single crystals, monolithic nano-crystalline and nano-structured materials, due to the ease of dislocation movement through and within the disordered grain boundary region, have very poor creep resistance. Typically, this class of nano-grained materials have creep rates which are three to four orders of magnitude higher than those of the coarse-grained counterparts.

In response to this seemingly detrimental structural change, considerable research efforts have been conducted to alter the number of available pathways accommodating mobile atoms or dislocations under the applied stress. That is, it has been hypothesized that depending on the exact character of these grain boundary regions, the ease of atom or dislocation movement could be unaffected and, under those conditions, the grain size will have little or no effect on the dominant creep mechanism. However, if the movement of atoms and dislocations could be impeded or controlled more effectively, then the creep resistance can be significantly improved.

Another critical factor in determining the creep behavior of the nano-structured material stems from the inherent instability of the fine-scale structure of this class of materials. This is because, with increasing temperature, unless their grain-size is stabilized, nano-crystalline and nano-structured materials will undergo rapid grain growth or coarsening, which will affect the local crystalline environment and thus the creep behavior.

Further, most structural materials are not monolithic. For the purposes of imparting a particular set of properties, materials are created to consist of a plurality of phases. Specifically, they consist of a primary phase and, a number of secondary, tertiary or other phases. Effectively, the introduction of the phases alter the grain boundary characteristics of the material. More specific to the spirit and the purpose of this invention, the nature and intent of these phases, introduced in the form of clusters, precipitates, and other substructures, are to alter, affect, and impede the movement of atoms, dislocations or grain boundaries in the bulk solid. In turn, the relative merit and their role in modifying the underlying creep mechanism will be apparent in the subsequent description.

The response can be attributed to a specific creep resistance interlocking nano-crytalline grain size and immobile nano-scale cage structure.

II. Interlocking Immobile Cage Structure

Reference is made herein to some earlier work concerning Cu—Ta for understanding the underlying microstructure of the materials of the present invention. But, as mentioned above, other metals are capable of being used, especially for high-temperature applications, according to embodiments.

Various methods may be used to induce both thermal and structural stabilization by dispersing one species in another. What differentiates one stabilization method from the other is how, and to what extent, the solute species is dispersed in the form of particulates or solute atoms. More specifically, the kinetic mode (e.g., Zener pinning) uses particles, whereas, the thermodynamic mode uses atoms and atom clusters for the stabilization process. Moreover, the extent of stability is dependent on the selection of the constituents in the sense, once they are forced to form a solution, will they retain this state indefinitely.

The traditional definition of an atom is the smallest subdivision in which a particular element still retains its unique characteristics and can be distinguished accordingly from another element. In contrast, particles may consist of individual grains or subgrains, which, in turn, could be made up of hundreds of atoms up to billions of atoms. The stabilization process, either kinetic or thermodynamic, entails emplacing the solute species, ranging in size from atoms to grains to particles, and inserting them into the sub-structure of the solvent. In a liquid, the solute and solvent species are randomly distributed, however, in the solid state, the solute can be emplaced at the atomic level directly into the crystal lattice of the solvent, and/or along grain or subgrain boundaries between crystals of varying sizes. In kinetic stabilization or pinning, the solute species is more of an obstacle preventing the free movement of grain boundaries, while in thermodynamic stabilization, the role of solute species is to alter the energy landscape to a much greater extent.

More specifically, on an atomic level, atoms can be forced into a metastable random solid solution or potentially occupy defect sights such as dislocations, triple junctions, and grain boundaries. This process is critical for setting up thermodynamic stabilization. The breakdown occurs due to the collisions of the particles during non-equilibrium processing, for instance, with the walls of the vial and the balls in ball milling. The energy deposited by the impact of the milling balls is sufficient to displace the atoms from their crystallographic positions. On a microscopic level, the particles fracture, aggregate, weld, and re-fracture causing the evolution of a heavily worked substructure in the milled powers.

Generally, in fine particulate materials, especially those with nano- to submicrometer sizes, there is an extremely large driving force to reduce the relative ratio of surface to volume area or surface to volume energy. This driving force is thermally activated and, therefore, occurs more efficiently at higher temperatures. The movement of particle or grain boundaries, causes fine particles or grains to coalesce, merge, and grow into larger particles or grains. If the temperature is near or in excess of 50% of the melting point of the material, this process is referred to as sintering. In addition to heat, if pressure could be applied to improve the sintering process, more rapid densification would occur, further eliminating voids between the particles. If diffusion distances could be kept at a minimum, uninterrupted species transport could then be allowed. While some of the coarsening can be controlled by careful adjustment and selection of sintering conditions (i.e., an optimization and manipulation of the three dimensional processing surface of time, temperature, and pressure), the coarsening is unavoidable.

Conversely, once the atomic level intermixing occurred, if the relative diffusivities of the constituents are slow, sluggish, or extremely slow, the particle (cluster), precipitates and defects will be rendered immobile in the host species. This fact is critical in the design step of this class of materials and alloys. That is, if one species can be distributed in another species, such that the relative positions of the former do not change with temperature or other externally introduced variables, it can essentially prevent any or all mechanisms for their redistribution within the structure. Looking at the distribution of these nano-scale defects in another way is that they essentially form a multiscale grid-like pattern in three dimensions, whereby, they prevent any possible mechanical motion of the nano-crystalline and nano-structured solvent grains, that would occur either by atomic rearrangement, sliding, or rotation into a more favorable position to relieve the meta-stability, more precisely, the unfavorable higher energy state of the composite material.

FIG. 1 illustrates a simplified schematic of an interlocking immobile cage structure for extreme creep resistant nano-crystalline metallic materials according to embodiments of the present invention. Nano-crystalline means a crystallite material which is a nano-sized grain structure (i.e., on the order of 1, 10 or 100 nm; less than about 1 micrometer). This may include ultra-fine particles which are typically defined as being sized between 100 and 1000 nm.

The cage can be thought of as an arrangement or network of fine scale precipitate particles in a bulk solid wherein the two components (solute and solvent species, respectively) form an interlocking structure.

The material is comprised of a matrix formed of a solvent metal or alloy and at least one solute metal or alloy dispersed therein. Metal, as used herein, may mean one or more elemental metals, mixtures and/or alloys (including intermetallic phases) thereof. Additives, such as trace elements may also be included.

Various binary, ternary, and higher order nano-crystalline and nano-structured metallic systems are described herein according to embodiments of the invention. According to these embodiments, the binary, ternary, or higher order nano-crystalline and nano-structured metallic system consist of solvent and solute phases. By design, the solute phase is imparted with a characteristic dispersion, distribution, morphology, and size or dimension within the solvent such that it affects the high temperature mechanical properties of the overall system.

In general, the solvent metal comprises 50 to 99.9 atomic percent (at. %) of the material, and the dispersed metallic solute metal comprise 0.1 to 50 atomic percent (at. %) of the material. The solvent metal may be a pure elemental metal or alloy thereof. Also, the solvent metal may comprise more than one elemental metal or alloy, in some instances.

The matrix has a lattice structure and formed of a multitude of grains. Grains are comprised of atoms or some particle having the same crystalline (or sub-crystalline) structure. On a nano- and micro-scopic level, creep is facilitated by the gradual rearrangement of the local nano-structure when atoms and vacancies move along the grain boundaries of adjacent grains, or sub-grains.

More particularly, each grain is formed of solvent metal atoms of a substantially singular crystalline lattice structure (crystallite), such as FCC or BCC, depending of the solvent matrix metal. The portion of FIG. 1 represents the matrix. It forms the medium of the metallic material. While not truly circular (and actually, of a more random polyhedral shape/cellular polygonal shape), grains are assumed to have an average size or diameter. The grains of the matrix have diameters of no more than about 500 nm, and typically ranging from about 10-200 nm. Grain boundaries occur at the interface of separate adjacent grains.

A plurality of dispersed metallic particles formed of solute metal(s) are present in the solvent metal matrix. The dispersed solute particle reside within grains and along the grain boundaries. They typically have average diameters of no more than about 200 nm. The particles number densities within the volume of material is generally within the range of $10^{15}$ to $10^{30}$ per cubic meter within the matrix. This range equates to an extraordinary high density. At least some of the particles may further contain additional element(s) such as oxygen (O), nitrogen (N), carbon (C), sulfur (S) or another trace element(s) (i.e. from the remainder of the periodic table). For example, O, N, C or S may constitute 20-30 at. % or even a higher percentage of the material, whereas the total composition of the trace elements (other than O, N, C or S) should not exceed about 1 at. % of the bulk composition. Additionally, in some instances, due to processing or otherwise, the particles may comprise solute metal along with some small amount of the solvent metal or alloy.

Figure 1C:
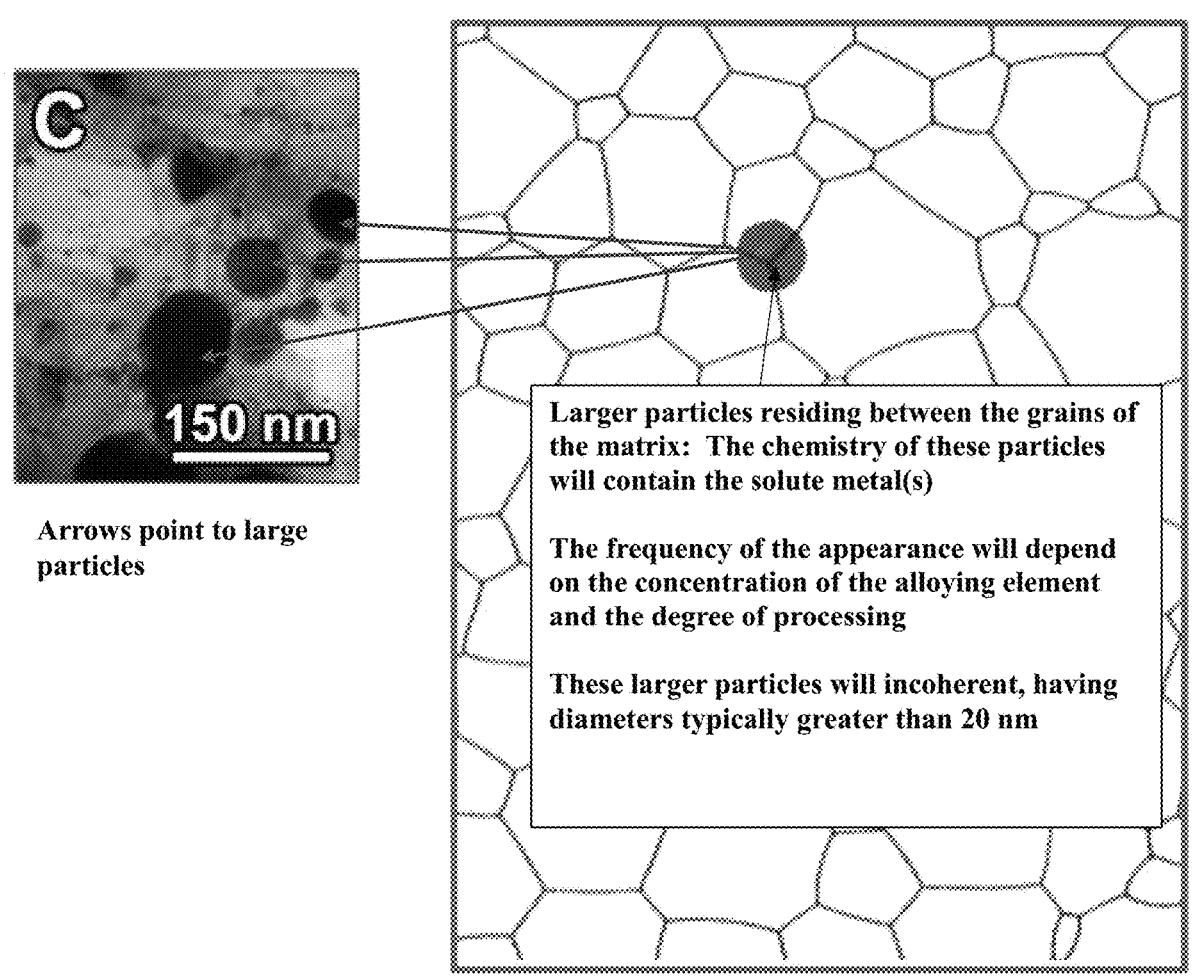

Particles may be characterized as being small (coherent or semi-coherent) or large (incoherent) based their size. The small particles have diameters typically less than 20 nm. They reside within the grains and/or on the grain boundaries, as further depicted in FIGS. 1A and 1B. FIG. 1A also includes a bright-field STEM (BF-STEM) image, labeled "B", highlighting the high density of nano-particles of various sizes. The different arrows designate the sizes of the different coherent/semi-coherent particles (i.e., ~1 nm, ~2.5 nm, and ≥4 nm radius). And FIG. 1B includes a high-resolution BF-STEM image, labeled "B" showing the bowing of the grain boundary (dashed lines) as it interacts with tantalum particles, and a magnified image of the circled portioned of the grain boundary, labeled "F", further detailing a 3-nm-diameter particle residing at a high-angle) (93° grain boundary. The arrows correspond to the direction of lattice planes of the copper matrix. Large particles reside between the grains of the matrix as further depicted in FIG. 1C. This figure also includes a TEM of the exemplary Cu-10Ta (at. %) material, labeled "C", showing the large particles in an actual material. The chemistry of these particles will contain the solute metal(s). These larger particles will be largely incoherent, having diameters typically greater than 20 nm. The frequency of the appearance of small and large particle will depend on the concentration of the solute metal(s) and the degree of processing.

Figure 2:
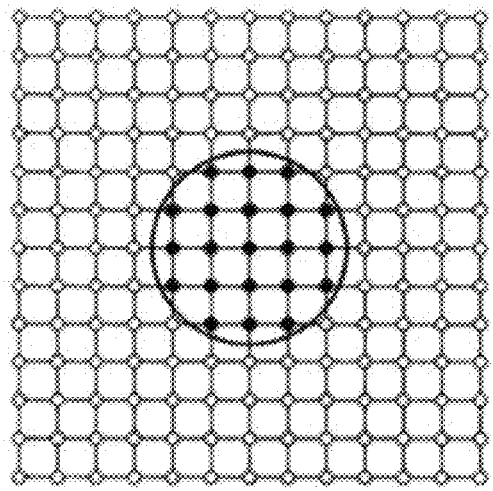
FIG. 2 shows various degrees of particle coherency with respect to an exemplary grain.
Figure 2:
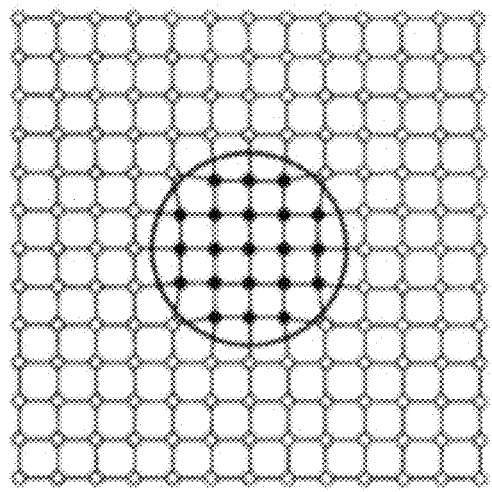
Figure 2:
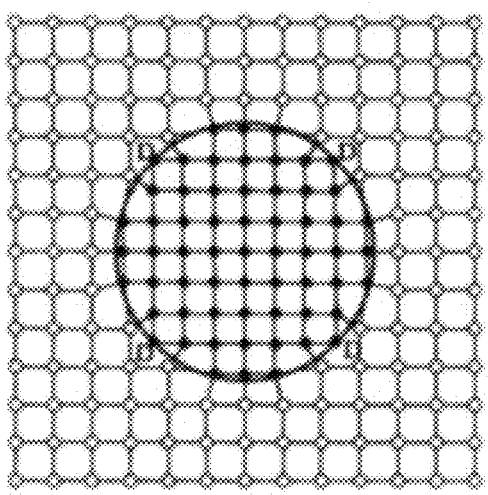
Figure 2:
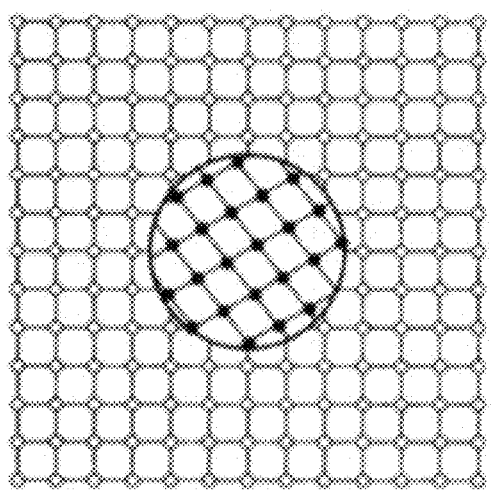

FIG. 2 shows various degrees of particle coherency with respect to a grain. Each grain of the matrix has a distinct lattice parameter/atomic spacing, which the particle(s) dispersed therein affect. One exemplary, representative grain is depicted in each of the sub-figures with an embedded particle (depicted as a circle) with different degrees of coherency. Coherency is described by the amount of strain energy required to maintain structural continuity across the interphase between the matrix and particles, i.e., perfect lattice matching. Sub-figure A shows the particle embedded in the grain with ideal coherency (i.e., no strained atomic bonds). Coherent particles have near-perfect coherency (i.e., negligible strained atomic bonds) with respect to the lattice of the grain, as shown in sub-figure B. The strain energy to maintain this coherency can range from zero to a level at which threading dislocations are introduced at the interface as to relieve the strain energy and maintain some partial level of continuity, i.e., lattice matching. See e.g., Mineral Science by Andrew Puntis Cambridge University Press 2003, ISBN 0 521-41922-0, pg. 336 & Materials Science and Engineering "An Introduction" William D Callister Jr. and David G Rethwisch, Wiley ISBN 978-1-118-32457-8, pg. 456, herein incorporated by reference.

It is well-known that a coherent particle can lose coherency upon coarsening above a critical diameter. This happens when the elastic energy with the coherent particle becomes large and it is energetically favorable for a dislocation to form at the matrix-particle interface. At this point, as shown in sub-figure C, the particle is considered semi-coherent. It lies between having structural continuity across the interface between the matrix and particles (i.e., of a coherent particle) and where the number of threading dislocations are so numerous that their core structures overlap (i.e., of an incoherent particle). The latter condition is shown in sub-figure D.

The amount of strain energy and hence degree of coherency is strongly dependent on the particle size and chemistry. The degree of coherency will be variant based on composition, but for the one Cu—Ta binary metallic system investigated by the inventors, lattice strains in the range of 0 to 14% exist for coherent particles. Further, the energy of the interface between the Ta-based particle and the Cu matrix can be used to quantify the type of coherency of these particles, and the range of the particles sizes which correspond to them. Characterizing the coherency at room temperature has indicated that the Cu—Ta based system has coherent particles when the particular diameter is less than 3.898 nm, and semi-coherent particles when their diameters are between 3.898 to 15.592 nm. Both coherent and semi-coherent particles form inside the grains and along the grain boundaries. Particles having diameters in excess of 15.592 nm (and up to 48.728 nm) are considered incoherent. The larger incoherent particles typically only form along the grain boundaries in the matrix.

Figure 3:
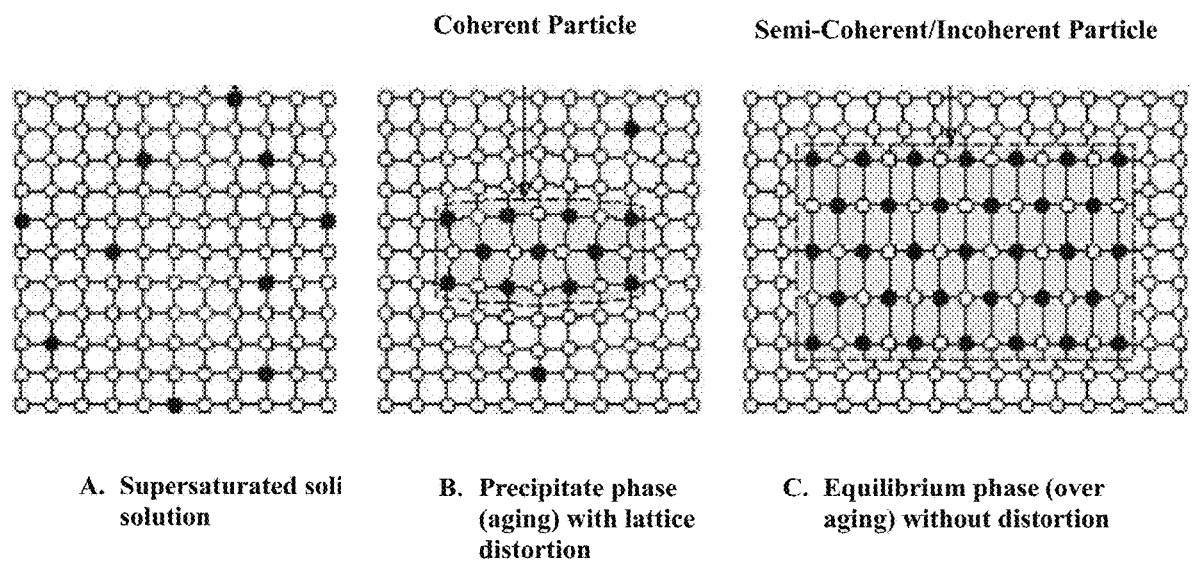
FIG. 3 shows formation of solute metal particles (coherent to incoherent) for a solid solution in a solvent metal matrix.

FIG. 3 shows formation of solute metal particles (coherent to incoherent) for a solid solution in solvent metal matrix. In the sub-figures, the white dots represent the solvent or matrix/lattice atoms and the black dots represent solute atoms. The solute metal atoms form the dispersed secondary phases, which become the particles. More particularly, the images show that, from the precipitation of a supersaturated solid solution (sub-figure A), a coherent particle (sub-figure B) initially forms, and can continue to evolve into a semi-coherent and or incoherent particle (sub-figure C) with time and temperature.

Most relevant to the underlying concept of this invention is the primary aspect or multiscale nature of the resultant structure. As illustrated in FIG. 1, the size of the solute atom species features span several sizes: large and small particles. This implies that, for any given level of dispersion of the solute atoms and their particles in the solvent, their length scales can easily range from nano- to micrometers. With a controllable distribution within grains and along grain boundaries of the solvent, these solute asperities can thus alter the overall properties and behavior of the resultant material. That is, if selected appropriately, the low mobility of the solute species could readily lead to a blocking of most if not all operating and dominant deformation mechanisms at those corresponding length scales. For example, the migration of interstitials and vacancies could be shut down at the atomic level by the presence of fine scale particles along grain boundaries. Likewise, larger precipitates can interfere with the motion of dislocations and disclinations in the solid.

Moreover, because of the thermal stability of the composite structure, the high temperature properties would be essentially unchanged from those at low temperatures, or be only slightly different.

The remarkable creep resistant properties of this material are due to the particle density along the grain boundaries of the matrix. The inventors conducted simulation by means of Large-scale Atomic/Molecular Massively Parallel Simulator (LAMMPS). These findings are detailed in the paper: Koju, R. K., Darling, K. A., Solanki, K. N., Mishin, Y., "Atomistic modeling of capillary-driven grain boundary motion in Cu—Ta alloys, *Acta Materialia* 148 (2018) 311-319, herein incorporated by reference. According to these simulations (see the last line in Table 1 in that paper), it was found that the critical particle density of one specific Cu—Ta composition investigated corresponds to about 14 nm$^2$ of grain boundary area per particle. However, it is duly noted, that this simulation-calculated density only blocks the GB motion and grain rotation on the molecular dynamics (MD) simulations timescale. On the experimental time scales, however, the density must be larger. It is hard to evaluate how much larger, but a factor of two or seven would be a reasonable estimate, giving a range of about 2-7 nm² of GB area per particle. (Note: 7 nm² per particle is actually a lower density than 2 nm²).

Nonetheless, it is believed that, when the particle density along the grain boundary of the matrix is high, such as about 2 nm² per particle, the particles are able to substantially block grain boundary motion and rotation and limit creep at elevated temperatures (e.g., temperatures above 35% of the melting point of the material; the value may be defined as a ratio of the temperature in question and the melting point of the base metal or alloy both being defined in the Kelvin scale). It is again noted that a larger grain boundary surface area of the particle equates to lower density per particles.

III. Manufacturing Processing and Methodologies

Figure 4:
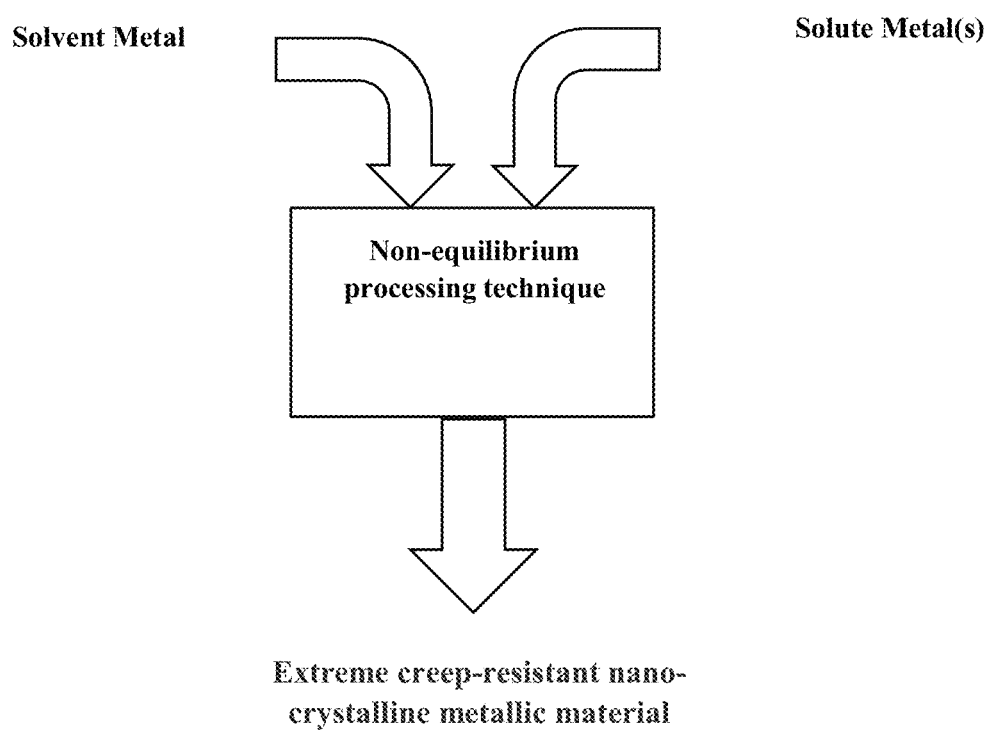
FIG. 4 is a schematic depicting a process for forming an extreme creep-resistant nano-crystalline metallic material according to embodiments of the present invention.

FIG. 4 is a schematic depicting a general process for forming extreme creep-resistant nano-crystalline metallic materials according to embodiments of the present invention. The solvent metal and one or more solute metals are brought together, and via a non-equilibrium processing technique, produce the extreme creep-resistant nano-crystalline metallic material. The non-equilibrium processing technique may be, but is not limited to, milling/machining (including ball milling), melt spinning, spray atomization, inert gas condensation, solution precipitation, physical vapor deposition, and electrodeposition. While all these techniques use powered metal precursors, the latter two may be better for coatings. Melt spinning forms thin ribbons of material.

Particulate (powdered) materials offer greater versatility when considering up-scaling to production and manufacturing levels. In part, this is because powder metallurgy is already a long-term, well established, and existing practice being used to produce many commercially available products through sintering and forging of metallic particles into fully dense objects.

Within milling there are two categories, high energy and low energy. High-energy milling is a term of art, which denotes powdered milling processes that facilitate alloying on an atomic level. U.S. Pat. Nos. 9,333,558 and 9,822,430 disclose some exemplary material systems and fabrication methodologies which, in accordance with embodiments of this invention, may be extended and/or adapted for providing nanostructures with extreme creep resistance. Those patents are herein incorporated by reference in their entireties and primarily described high-energy milling. As such, they utilize significantly higher impact energies than other powdered milling processes, such as planetary milling or attritor milling, wherein, due to the physical design of the apparatus, the energy imparted to the powder is less. Examples of high-energy milling includes high energy ball milling apparatuses such as the SPEX Industries, Edison, N.J. series of mills and Zoz GmbH, Germany, series of mills. Relatively lower energy types include the Pulverisette planetary ball mills from Fritsch GmbH, Idar-Oberstein, Germany; the PM series of planetary ball mills from Retsch GmbH, Dusseldorf, Germany; or the attritor type mills from Union Process, Akron, Ohio. For a more detailed comparison of milling devices, see, e.g., Table 1-2 on page 3 of H. Zoz, H. Ren, R. Reichardt, H. U. Benz, "Mechanical Alloying—Principle, Development & Current Activities (Part I-VII)," Thermec2000, International Conference on Processing & Manufacturing of Advanced Materials Dec. 4-8, 2000, Las Vegas, Nev., U.S.A., (available online at:) http://gmb-h.zoz.de/_AKTUELL/pdf_content/publications/v14.pdf) herein incorporated by reference in its entirety.

However, many of the lower energy mills (Planetary, Attritor and Drum) might be configured to produce materials as described herein. That is, the kinetic energy of the mills or the energy dosage, i.e., energy input into the starting metal powders can be increased by extending the milling time and or increasing the ball-to-powder ratio. Where the ball-to-powder ratio is defined by the mass of the milling ball bearings to that of the powder mass. In high energy milling processes the ball-to-powder ratio is between 1-10. However, in lower energy mills, the ball-to-powder ratio can be increased to values between 10-100. The same order of magnitude increase can be true of the milling time as well. Increasing both the ratio and the milling time can ultimately result in a lower energy mill being able to produce a similar powder product as in the high energy mills. It is noted, however, that due to inherent limitations on the devices themselves and their operation (such as the kinetic energy generated), not all low energy milling devices may be usable or otherwise practical for practicing embodiments of the invention.

Depending on the extent of milling operations, the range of intermixing varies from very large clusters (on the order of micro- to millimeters, containing a very large number atoms), to precipitates (nano- to micrometers, containing thousands of atoms), to particles (nanometers, containing tens of atoms), to single atoms. High energy may be imparted to the metallic system by applying high levels of kinetic or dynamic energy during the milling process where vials containing the precursor solvent and solute metals are shaken back and forth thousands of times a minute using impact milling media resulting in more than twice as many impacts a minute.

In general, mechanical milling/alloying produces nano-structured materials with grain sizes well below 100 nm by repeated mechanical attrition of coarser grained powdered materials. Precursor powders are loaded into a steel vial and hardened steel or ceramic balls are also added. The vial then is sealed and shaken for extended periods of time. For example, the vials may be shaken 1060 times a minute resulting in some 2120 impacts a minute. This high-energy ball milling results in an almost complete breakdown of the initial structure of the particles. The result particles can have average particle size or agglomerate size as low as 1-10 mm.

More specifically, on an atomic level, atoms can be forced into a metastable random solid solution or potentially occupy defect sites such as dislocations, triple junctions, and grain boundaries. This process is critical for setting up thermodynamic stabilization. The breakdown occurs due to the collisions of the particles with the walls of the vial and the balls. The energy deposited by the impact of the milling balls is sufficient to displace the atoms from their crystallographic positions. On a microscopic level, the particles fracture, aggregate, weld, and re-fracture causing the evolution of a heavily worked substructure in the milled powers. If more than one powder component is added into the vial, the components will be intimately mixed at an atomic level. As in mechanical alloying, this re-welding and re-fracturing continues until the elemental powders making up the initial charge are blended on the atomic level, such that either a solid solution and/or phase change results. The chemistry of the resulting alloy is comparable to the percentages of the initial elemental powders. With continued milling time, grain size reduction occurs, which eventually saturates at a minimum value that has been shown to scale inversely with melting temperature of the resultant compound. Of course, the process cycle can be interrupted to obtain intermediate grain size refinement of the powder blend and intermixing of its constituents.

The diameter, density, mass, number and/or ratio of the milling media may be altered to maintain the ball to powder mass (weight) ratio sufficiently high so as influence the rate of breakdown, physical microstructure, and morphology of the resultant powder produced. For instance, the ball-to-powder mass ratio may be 4:1, 10:1 or more.

To avoid cold welding and sticking to the vial and milling media, the milling process could be carried out using an additive, such as a surfactant. The additive or a surfactant may or may not be a liquid at room temperature.

The milling process may be performed at ambient or room temperature. Alternatively, the metallic powders can be continuously or semi-continuously cooled during the milling process. For instance, the milling process may be carried out using a liquid cryogen or low temperature fluid, such as liquid nitrogen. The formation of solid solutions between the constituents could be thought of as a competition between the external force of impinging balls creating finer and finer levels of intermixed alloy material via consolidation, shearing, and plastic deformation and competing processes such as diffusion-driven events such as phase separation. Thus, if mechanical milling could be performed at low enough temperatures, interdiffusion events, which are thermally activated, could all together be suppressed. As such, the likelihood of producing a solid solution is greatly enhanced. Given that the effect of the competing process is nullified, the result will be not only a much greater refinement of the grain size but also a much larger increase in the concentration of the solute in the solvent, i.e., though, non-equilibrium, the solubility limit will be higher.

In some embodiments, the elemental components are brought to a sufficiently high temperature as to create a solid solution which is then quenched rapidly to produce a supersaturated solid solution of the individual constituents. For instance, the material could be manufactured in powder form by spray atomization techniques where in the elemental components are brought to a sufficiently high temperature as to create a solid solution. Additionally, the elemental components might be brought to a sufficiently high temperature as to create a solid solution which is then quenched rapidly to produce a supersaturated solid solution of the individual constituents.

Conventional problems associated with high temperature creep deformaton that usually result in part failure can be eleviated by using the novel metallic systems. Indeed, these materials are suited for applications which require high temperature performance for extended periods of time, such as, for example: turbine blades, moving parts, or structural components in load bearing applications.

It may be further advantageous to decompose the supersaturation by applying a heat treatment. This heat treatment occurs when subjecting the solid solution to high enough temperature to allow precipitation of the solute species in the solvent and as a result the formation of the cage like structure can occur or be hastened to do so.

IV. Material Selection for High Temperature Machine Parts.

High temperature machine parts are formed of a consolidated nano-crystalline metallic material comprising.: a matrix formed of a solvent metal comprising crystalline grains having diameters of no more than about 500 nm; and a plurality of dispersed metallic particles formed on the basis of a solute metal in the solvent metal matrix and having diameters of no more than about 200 nm. The particle density along the grain boundary of the matrix is as high as about 2 $nm^2$ of grain boundary area per particle so as to substantially block grain boundary motion and rotation and limit creep at temperatures above 35% of the melting point of the consolidated nano-crystalline metallic material.

Various bulk consolidation processes of the nano-crystalline metallic material can be utilized to form the high temperature machine parts in embodiments. For example, such consolidation processes may include: pressure-less sintering, hot isostatic pressing, cold isostatic pressing, hot pressing, powder injection molding, friction stir weld processing, cold and thermal spray, laser and non-laser based additive manufacturing techniques, ultrasonic consolidation techniques, vacuum arc melting, field assisted sintering (also known as spark plasma sintering), dynamic compaction using explosives or forging-like operations, high pressure torsion and extrusion methodologies including hot extrusion, cold extrusion, swaging and equal channel angular extrusion. The consolidation can occur can occur at ambient conditions or at elevated temperature exposure.

Selection of Solvent Metal.

Solvent metals for high temperature applications will need to have a high melting point, for instance, in excess of about 1,250° C. Some exemplary solvent metals include, but are not limited to: iron (Fe), nickel (Ni), titanium (Ti), cobalt (Co), vanadium (V), niobium (Nb), tantalum (Ta), molybdenum (Mo) and tungsten (W), for instance.

Table 1, below, details the melting points of these elemental metals which may be used as solvent metals with respect to embodiments. Note: These melting points are subject to change upon alloying. These specific solvents were selected based on their high melting points relative to other elements. A high melting point is required for using as a component in advanced engine and energy applications.

TABLE 1

| Solvent melting points (Pure Elemental). | |
|---|---|
| Metal | Melting Point (in Celsius) |
| Fe | 1,538 |
| Ni | 1,455 |
| Co | 1,495 |
| Ti | 1,668 |
| V | 1,910 |
| Nb | 2,477 |
| Mo | 2,623 |
| Ta | 3,017 |
| W | 3,422 |

Selection of Solutes Metal(s).

The selection of the solute metal(s) should be compatible with the selected solvent metal in order to provide stabilizing nanocrystalline alloys. Not all solvent/solute combinations may be possible or otherwise practical.

Earlier work (see Mark A. Atwater and Kris A. Darling, "A Visual Library of Stability in Binary Metallic Systems: The Stabilization of Nanocrystalline Grain Size by Solute Addition: Part 1," ARL-TR-6007, May 2012, herein incorporated by reference in its entirety), discloses a model to provide a practical approach for calculating the reduction in grain boundary energy to assess possible solutes for stabilizing nanocrystalline alloys. In its appendix, a comprehensive library is provide which displays the stabilization capabilities of 44 solvents, each with 52 possible solutes, for a total of 2288 combinations.

For a given element (to be used as a solvent), parameters such as the values for elastic enthalpy, mixing enthalpy, minimum normalized grain boundary energy, and the boundary concentration at the free energy minimum are reported within acceptable ranges for the solvent. (See FIGS. 1 and 2 of ARL-TR-6007 for a more detail explanation of the data presentation). This modeling approach and data can be extended to determine solute(s) for high temperature machine parts according to embodiments of the present invention.

In development of the model, the free energy change due to solute segregation to a grain boundary can be expressed by:

$$\Delta G_{seg} = (\gamma_A - \gamma_B)(1-\alpha)\sigma - \frac{8\Delta H_m}{Z}[z_{in}(X_A^s - X_A^b) - z_{out}[(X_A^b - 1/2) - \alpha(X_A^s - 1/2)]] + \Delta H_{el} - RT\ln\left[\frac{X_A^b(1-X_A^s)}{X_A^s(1-X_A^b)}\right] \quad (1)$$

where $\alpha=\frac{5}{6}$ to account for cross-boundary bonding, $\sigma$ is the surface area per mole, $X_A^b$ and $X_A^s$ represent the bulk and grain boundary concentrations of the solute respectively, and $\Delta H_m$ is the enthalpy of mixing of an equimolar liquid of A and B, $\Delta H_{el}$ is the change in elastic enthalpy. The last term in Equation 1 is the entropy of segregation which can be represented by $\Delta S_{seg}$. Given that $\Delta G_{seg} = \Delta H_{seg} - T\Delta S_{seg}$, rearrangement of Equation 2 below $$\gamma = \gamma_b + \Gamma_s[\Delta H_{seg} - T\Delta S_{seg}] \quad (2)$$

where $\gamma_b$ is the interfacial energy of the solvent, $\Gamma_s$ is the specific solute excess at the interface, T is the absolute temperature, and $\Delta H_{seg}$ and $\Delta S_{seg}$ are the enthalpy and entropy of solute segregation respectively, gives the normalized grain boundary energy equation 3 as:

$$\gamma/\gamma_b = 1 + \Gamma_s \frac{\Delta G_{seg}}{\gamma_b} \quad (3)$$

where the grain boundary surface excess for the bilayer model is given by $\Gamma_s = 2(X_A^s - X_A^b)/\sigma$ and the interfacial energy for a grain boundary, $\gamma_b$, can be estimated as one-third the solvent surface energy. The grain boundary energy is based on the pure solvent, not for the mixture, as the alloy is assumed to be dilute and strongly segregating. Alloys where these two assumptions are not satisfied may deviate from the predicted behavior.

Results for the grain size stability as a function of temperature and total solute content requires a mass balance equation such that the bulk concentration of solute is given by:

$$X_A^b = \frac{\frac{6(V_b)^{1/3}}{d}X_A^s - X_o}{\frac{6(V_b)^{1/3}}{d} - 1} \quad (4)$$

where $X_o$ is the global solute content (bulk and boundary concentrations together) and d is the grain size. Equation 4 can be substituted into Equation 1 in order to calculate the free energy as a function of total solute concentration, grain size, and temperature making it a powerful tool for predicting the microstructural stability of a nanocrystalline metal.

This model provides a practical approach for calculating the reduction in grain boundary energy to assess possible solutes for stabilizing nanocrystalline alloys. The approach presented here provides a qualitative method of selecting grain growth inhibiting solutes. To evaluate the applicability of this model to a specific problem or system, it may be useful to consider the phenomena it captures and those it neglects.

This model captures: boundary energy reduction upon segregation (Equation 3); chemical enthalpy (Equation 4); solvent-solute interaction (Equation 5); elastic enthalpy (Equation 6); changes in configurational entropy (last term in Equation 7); temperature effects (last term of Equation 7); reduction in the strength of intergranular bonds compared to the intragranular bonds ($1^{st}$ term of Equation 7); and grain size effects (Equation 9). However, it is noted that this model does not account for: the formation of secondary phases directly, however, the mixing enthalpy can be used to identify systems in which phase formation is likely to occur; the retained elastic misfit of segregated solute; change in the regular solution interaction parameter and elastic misfit due to changes in composition temperature, or strain; excess entropy contributions; multi-specie co-segregation effects; electronic contributions; and relaxation effects.

Using the aforementioned model in ARL-TR-6007, one can evaluate and assess solute(s) candidates for each candidate solvent/solute combined species based on four parameters. For a candidate solute metal, these parameters include: the elastic enthalpy, mixing enthalpy, minimum normalized grain boundary energy, and the boundary concentration at the free energy minimum. Typical acceptable ranges for values of these four parameters for a solvent-solute combination are listed in Table 2, below, which can be used as a selection criteria. One, all, or any sub-combination of these four parameters may be used. Specifically, the parameters can be used to estimate the thermodynamic stability (i.e. solute segregation) and/or the likely hood of phase formation, the kinetics of diffusion and particle coarsening, all of which influence the stability of the microstructure and its inherent creep resistance. Thus systems predicted to be stable with good creep resistance will be so due to thermodynamic, kinetic particle pinning or some combination of these.

TABLE 2

Selection criteria for a solvent-solute combination

| Parameter | Acceptable Range |
|---|---|
| Elastic Enthalpy | 1 to 250 kJ/mol |
| Mixing Enthalpy | −150 to +150 kJ/mol |
| Minimum Normalized Boundary Energy: | 1 to 40% |
| Boundary concentration at the free energy minimum | 10 to 100% |

These values assume a grain size 30 nm, 0.010 solute fraction (1%), and temperature 273K among others model assumptions. Changes in the value of the independent variables in the above thermodynamic model, namely grain size, global solute content, and temperature will change the prediction of the stabilized state. Therefore systems or states predicted to be stable given a particular set of values for the independent variables can be predicted to be unstable give a particular set of alternative values of the same independent variables.

A snap shot of one particular point within the entire free energy landscape of stabilized nanocrystalline states, which again are entirely dependent on the values of the independent variables is presented in a periodic table format in the appendix of ARL-TR-6007 for many base solvents, where the pertinent parameters are reported numerically and by color-coding to facilitate quick identification of stable alloys in the provided reference. (Note: a selection of these tables is also included in the aforementioned '500 provisional application for the metals: Fe, Ni, Co, V, Nb, Mo, Ta and W). In those period table entries, the elastic enthalpy, mixing enthalpy, minimum normalized grain boundary energy, and the boundary concentration at the free energy minimum are colored in Yellow, (a scale of Red to White to Blue), Green and Orange respectively. All parameters give the specified values of the independent variables fall within the provided normal range.

Table 3, below, shows predicted stable and creep resistant binary nanocrystalline alloys (given as a solvent and stabilizing solute addition) which would be suitable for moderate and high temperature applications, above about 1,250° C., in accordance with embodiments. This table was constructed using input parameters such as 10 nm average grain size, respective 90% homologous temperature (where the temperature is taken as the absolute value of the pure elemental solvent) and a solute concentration equal to 50 atomic percent. This is believed that the output of the thermodynamic model using these values will be all inclusive with prediction, meaning that changes in grain size, homologous temperature and lower solute content, or any combination thereof will result in the same predicted stable binary systems provided in Table 3 (i.e. a segregated thermodynamic stable state or a precipitated kinetically stable state). Please note changes in the model parameters (grain size, solute content and temperature) will result in changes in the predicted alloy types.

TABLE 3

Predicted binary and higher-order systems that will be creep resistant for high-temperature machine parts.

| Metal Solvent | Stabilizing Metal Solutes |
|---|---|
| Fe | Li, Be, Na, Mg, K, Ca, Rb, Sr, Cs, Ba, Sc, Y, Ti, Zr, Hf, Nb, Ta, Mo, W, Re, Cu, Ag, Au, Zn, Cd, Hg, B, Al, In, Tl, Si, Sn, Pb, Sb, Bi, La |
| Ni | Li, Be, Na, Mg, K, Ca, Rb, Sr, Cs, Ba, Sc, Y, Ti, Zr, Hf, Nb, Ta, Mo, W, Re, Cu, Ag, Au, Zn, Cd, Hg, B, Al, In, Tl, Si, Sn, Pb, Sb, Bi, La |
| Co | Li, Be, Na, Mg, K, Ca, Rb, Sr, Cs, Ba, Sc, Y, Ti, Zr, Hf, Nb, Ta, Mo, W, Re, Cu, Ag, Au, Zn, Cd, Hg, B, Al, In, Tl, Si, Sn, Pb, Sb, Bi, La |
| Ti | Li, Be, Na, Mg, K, Ca, Rb, Sr, Cs, Ba, Sc, Y, Zr, Cr, Mn, Fe, Co, Ni, Cu, B, Al, In, Tl, Si, Sn, Pb, Sb, Bi, La |
| V | Li, Be, Na, Mg, K, Ca, Rb, Sr, Cs, Ba, Sc, Y, Zr, Hf, Cu, Ag, Cd, Hg, B, In, Tl, Sn, Pb, Sb, Bi, La |
| Nb | Li, Be, Na, Mg, K, Ca, Rb, Sr, Cs, Ba, Sc, Y, Zr, Cu, Ag, Cd, Hg, B, In, Tl, Sn, Pb, Sb, Bi, La |
| Mo | Li, Be, Na, Mg, K, Ca, Rb, Sr, Cs, Ba, Sc, Y, Zr, Hf, Cr, Mn, Fe, Co, Ni, Cu, Ag, Zn, Cd, Hg, B, In, Tl, Sn, Pb, Sb, Bi, La |
| Ta | Li, Be, Na, Mg, K, Ca, Rb, Sr, Cs, Ba, Sc, Y, Zr, Cr, Mn, Fe, Co, Ni, Cu, Ag, Zn, Cd, Hg, B, In, Tl, Sn, Pb, Sb, Bi, La |
| W | Li, Be, Na, Mg, K, Ca, Rb, Sr, Cs, Ba, Sc, Y, Zr, Hf, Cr, Mn, Fe, Co, Ni, Cu, Ag, Zn, Cd, Hg, B, In, Tl, Sn, Pb, Sb, Bi, La |

An Exemplary Ni-5Y Material System.

The inventors considered a nanocrystalline nickel-5 atomic percent yttrium i.e. (Ni-5Y) alloy. The model for grain boundary segregation and grain size stability was applied for the purpose of assessing the stability of distinct binary nanocrytalline systems. Figure A-16 (Nickel) in ARL-TR-6007 predicts Ni—Y alloys to be stable, i.e., by the green color and the corresponding value of 0.00 for the minimum normalized grain boundary energy. The Ni-5Y alloy system was produced by high energy ball milling followed by equal channel angular extrusion or ECAE. This is same processing used to produce the Cu—Ta embodiments disclosed in the aforementioned parent '804 patent application.

More specifically, the Ni—Y alloys were synthesized with the desired ultrafine-grained microstructures using powder processing techniques and controlling parameters such as milling temperature, milling time, ECAE temperature, and thermo-mechanical processing conditions. Elemental Ni and Y powders (−325 mesh and 99.9% purity), with appropriate weights to obtain Ni-5at. % Y composition, were loaded into a hardened steel vial along with the milling media (440 C stainless steel balls) inside a glove box with an Ar atmosphere (oxygen and $H_2O$ are <1 ppm). The ball to powder ratio was maintained at 10:1. A SPEX 8000 M shaker mill was utilized to perform the milling at cryogenic temperature (verified to be ~−196° C.) for 8 hrs using liquid nitrogen. The binary Ni-5at. % Y powder was consolidated to bulk via ECAE. Before starting the ECAE process, the die assembly used for processing the billets was preheated to 623 K (350° C.) to minimize thermal loss during the ECAE processing. The billets, heated and equilibrated to 1373 K (1100° C.) for 40 min, were dropped into the ECAE tooling as quickly as possible from the furnace and extruded at a rate of 25.5 mm/s. These steps were repeated 4 times following route Bc to prevent imparting a texture to the consolidated powder. By extruding through an angle of 90°, a total strain of 460% was imparted onto the powder-containing billet as a result of processing. The high temperature exposure during ECAE processing help produce the stable cage like structure as a result of the thermal decomposition of the former solid solution. Specimens for mechanical testing were then machined from these billets, within the region containing the consolidated powder, via wire electric discharge machining into 3 mm length by 3 mm diameter cylinders for mechanical creep testing.

FIGS. 5A and 5B are bright field transmission electron micrographs of the Ni-5Y produced at two different resolutions. Note the scale of 0.5 μm and 100 nm, respectively. They show the microstructure is comprised of grains having an average diameter of approximately 250 nm, as well as large and smaller coherent particles which stabilize the grain size against temperature exposure and at the same time increase the strength at temperature. The large and small particles have been identified as yttrium oxides and nitrides or some combination of the two. The identification was made possible by x-ray diffraction analysis in combination with energy dispersive spectroscopy and transmission electron microscopy.

FIG. 6 is a plot showing the high temperature strength of the Ni-5Y alloy being deformed in compression at a strain rate of 0.0001 1/s. The compression stress strain curves are given for various temperatures at various temperatures from room temperature (RT) to 600° C. It confirms a yield strength of greater 1 GPa at room temperature for this material. The curves also show that Ni-5Y maintains a reasonably high strength with increase in temperature up to 600 degrees Celsius. The retention of such strength verifies the Ni-5Y for high temperature applications.

FIG. 7 is a plot showing creep plots of strain versus time at temperature for Ni-5Y at two different stresses as fractions of the temperature yield stress, 50 and 90%, respectively. Analysis of the creep curves indicate a low steady state creep rate specifically at 50% of the yield stress. In particular, the steady state creep is 9.86E-07 for the sample loaded to 90% of yield, and the initial steady state creep is 4.48E-08 for the sample loaded to 50% of yield. This low creep rate is an additional preliminary metric for high temperature turbine blade and engine gear application.

The novel high temperature materials have applicability to any engine/structural component made from a stabilized nano-crystalline alloy, such as: engine gears/components, turbine blades, hypersonics, radiation shielding and other high temperature components made from stabilized nano-crystalline alloys of different base materials. Turbine engine components general include, for instance, air inlets, compressors, bypass ducts, shafts, diffuser components, turbine blades, combustion, exhaust afterburner and supersonic nozzles. Hypersonics may include rocket components, such as nozzles. Radiation shielding includes components used in the nuclear industry.

FIG. 8A shows a typical turbine blade, and FIG. 8B shows a series of typical engine gears, as example machine parts, which can be fabricated according with the novel NC materials according to embodiments. As can be appreciated from these figures, the turbine blades and engine gears have extremely complex geometries, including, high-pressure airfoils, vanes, vane rings, shrouds and nozzle segments and cooling channels. Producing these from less expensive powder-metallurgy and near net shaping according to embodiment would make even move of a market impact. The high temperature machine parts formed from consolidated nano-crystalline material according to embodiments of the present invention may be similar fabricated to have complex designs known in the art.

Components and parts comprised of the disclosed microstructures above are capable of achieving properties that are extraordinarily high in comparison to what you would normally see in a conventional nanocrystalline material and therefor provides a pathway for revolutionize engine and flight technology.

With modeling efforts used to predict Cu—Ta and Ni—Y alloys extending to other high-temperature metals (such as Fe, Ti, Co, V, Nb, Ta, Mo and W) which are much cheaper than Ni single crystal super alloys will provide far superior performance to offset the cost. It is expected that such high temperature materials will exhibit at least 1 GPa yield strength at room temperature and steady state creep rates of less than or equal to $10^{-6}$ at the respective homologous temperature. The microstructure is also be stabilized against coarsening and be maintained at elevated temperatures within the limits defined above.

Turbine blades or other high temperature engine gears/structural parts comprised of a metal microstructure or components thereof having a mean grain size of less than about 500 nanometers, and even more advantageously less than about 250 nm. This material, termed ultra-fine or nano-crystalline will exhibit high thermo-mechanical stability under the application of stress and elevated temperature. The material may be composed of Fe, Ni, Ti or refractory metal such as Co, V, Nb, Ta, Mo or W powders consolidated and formed into functional parts, as non-limiting examples. Each powder particle will have in internal microstructure with size and length scale as described above. It is expected that such materials will exhibit at least 1 GPa yield strength at room temperature and steady state creep rates of less than or equal to $10^{-6}$ at the respective homologous temperature. The microstructure is also be stabilized against coarsening and be maintained at elevated temperatures within the limits defined above.

Results demonstrate is that high temperature machine parts and components comprised of the disclosed microstructures above are capable of achieving properties that are extraordinarily high in comparison to what you would normally see in a conventional nano-crystalline material and therefor provides a pathway for revolutionize engine and flight technology. When the same nanotechnology as Cu—Ta is manifested in alloys based on high temperature metals (such as Fe, Ni, Ti, Co, V, Nb, Mo, Ta or W) massive gains will be attained (i.e. 200-1500° C. increases).

Properties i.e. creep rates and creep exponents have been obtained in compression for Cu—Ta and Ni—Y at elevated temperatures demonstrates that the conventional creep mechanisms are inoperative. It is surmised that the as-processed microstructure is preventing them from operating. These novel materials are capable of operating at higher temperature and have 6-8 orders of magnitude lower strain rate (t). Such a response is reminiscent and more comparable to that of the creep performance achieved by advanced single-crystal Ni-based superalloys (~$\dot{\varepsilon}$ of $10^{-8}$ s$^{-1}$).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A high temperature machine part formed of a consolidated nano-crystalline metallic material comprising:
   a matrix formed of a solvent metal having a melting point greater than 1,250° C. comprising crystalline grains having diameters of no more than about 500 nm; and
   a plurality of dispersed metallic particles formed on the basis of a solute metal in the solvent metal matrix and having diameters of no more than about 200 nm,
   wherein the particle density along the grain boundary of the matrix is as high as about 2 nm$^2$ of grain boundary area per particle so as to substantially block grain boundary motion and rotation and limit creep at temperatures above 35% of the melting point of the consolidated nano-crystalline metallic material.

2. The machine part of claim 1, wherein the solvent metal comprises 50 to 99.9 atomic percent (at. %) of the part material, and the dispersed metallic solute metal comprise 0.1 to 50 atomic percent (at. %) of the part material.

3. The machine part of claim 1, wherein the solvent and solute are selected such that the elastic enthalpy is 1 to 250 kJ/mol, the mixing enthalpy is −150 to +150 kJ/mol, the minimum normalized boundary energy is 1 to 40%, the boundary concentration at the free energy minimum is 10 to 100%, or any combination thereof.

4. The machine part of claim 1, wherein the solvent metal comprises: iron (Fe), nickel (Ni), titanium (Ti), cobalt (Co), vanadium (V), niobium (Nb), tantalum (Ta), molybdenum (Mo) or tungsten (W).

5. The machine part of claim 4, wherein the solvent metal comprises nickel (Ni) and the solute metal comprises yttrium (Y).

6. The machine part of claim 5, wherein the part material comprises Ni-5at. % Y.

7. The machine part of claim 1, wherein the particles number densities within the volume of material is in the range of $10^{15}$ to $10^{30}$ per cubic meter.

8. The machine part of claim 1, wherein the creep rate is less than $10's^{-1}$ at greater than 35% of the melting point of the part material.

9. The machine part of claim 1, wherein the creep rate is less than $10's^{-1}$ at greater than 20% of their respective yield point values at temperatures greater than 35% of the melting point of the part material.

10. The machine part of claim 1, wherein at least some of the particles further comprise additional elements.

11. The machine part of claim 1, wherein at least some of the particles comprise coherent particles having diameters less than about 5 nm.

12. The machine part of claim 1, wherein at least some of the particles comprise semi-coherent particles having diameters between about 5 nm and about 20 nm.

13. The machine part of claim 1, wherein at least some of the particles comprise incoherent particles having diameters in excess of about 20 nm but no more than about 200 nm.

14. The machine part of claim 1, wherein the solute metal is at least 0.1 atomic percent of the material so as to limit rotation of grains to no more than about 45 degrees.

15. The machine part of claim 1, wherein the material has a room temperature yield strength of at least 1 GPa.

16. The material of claim 1, wherein the material has a room temperature compressive ductility greater than about 3% or a tensile ductility of at least about 0.5%.

17. The machine part of claim 1, wherein the machine part comprises a turbine part, engine part, gear, hypersonic, or radiation shielding.

18. A process for forming high temperature machine part comprised of a solvent metal comprising 50 to 99.9 atomic percent (at. %) of the part material, and at least one solute metal dispersed in the solvent metal, comprising 0.1 to 50 at. % of the part material, the process comprising:
    subjecting powdered metals of the solvent metal and the at least one solute metal to a non-equilibrium processing technique and/or followed by exposure to elevated temperatures so as to produce:
        a matrix formed of a solvent metal or alloy having a melting point greater than 1,250° C. comprising crystalline grains having diameters of no more than about 500 nm; and
        a plurality of dispersed metallic particles formed from a basis of the solute metal in the solvent metal matrix and having diameters of no more than about 200 nm,
        wherein the particle density along the grain boundary of the matrix is as high as about 2 $nm^2$ of grain boundary area per particle so as to substantially block grain boundary motion and rotation and limit creep at temperatures above 35% of the melting point of the material; and
    performing a bulk consolidation process on thus produced material to form the machine part.

19. The process of claim 18, wherein the non-equilibrium processing technique comprises: milling, melt spinning, spray atomization, inert gas condensation, solution precipitation, physical vapor deposition, or electrodeposition.

20. The process of claim 19, wherein the milling is high energy milling or low energy milling.

21. The process of claim 18, wherein the bulk consolidation process comprises: pressure-less sintering, hot isostatic pressing, cold isostatic pressing, hot pressing, powder injection molding, friction stir weld processing, cold and thermal spray, laser and non-laser based additive manufacturing techniques, ultrasonic consolidation techniques, vacuum arc melting, field assisted sintering, dynamic compaction using explosives or forging-like operations, hot extrusion, cold extrusion, swaging or equal channel angular extrusion.

* * * * *